US010463995B2

(12) United States Patent
Roberts et al.

(10) Patent No.: US 10,463,995 B2
(45) Date of Patent: Nov. 5, 2019

(54) APPARATUS AND METHOD FOR REMOVING IMPURITIES FROM WATER OR WASTEWATER

(71) Applicant: ROBERTS MARKETING DE, INC., Wilmington, DE (US)

(72) Inventors: R. Lee Roberts, Rose Valley, PA (US); Roderick Ross Mellott, Mountville, PA (US)

(73) Assignee: Roberts Marketing DE, Inc., Wilmington, DE (US)

( * ) Notice: Subject to any disclaimer, the term of this patent is extended or adjusted under 35 U.S.C. 154(b) by 35 days.

(21) Appl. No.: 15/282,026

(22) Filed: Sep. 30, 2016

(65) Prior Publication Data

US 2018/0093231 A1    Apr. 5, 2018

(51) Int. Cl.
*B01D 24/46* (2006.01)
*C02F 1/00* (2006.01)
(Continued)

(52) U.S. Cl.
CPC .......... *B01D 24/4636* (2013.01); *C02F 1/001* (2013.01); *C02F 3/165* (2013.01); *B01D 24/007* (2013.01); *B01D 24/205* (2013.01); *B01D 24/263* (2013.01); *B01D 24/4631* (2013.01); *B01D 24/4684* (2013.01);
(Continued)

(58) Field of Classification Search
CPC .......... B01D 24/4631; B01D 24/205; B01D 24/263; B01D 24/007; B01D 24/4684; F16L 27/12; F16L 27/125; F16L 19/086; F16L 19/005; C02F 1/001; C02F 3/165; C02F 2303/16; Y02W 10/15
See application file for complete search history.

(56) References Cited

U.S. PATENT DOCUMENTS 1,204,728 A * 11/1916 Arena ............... F16L 27/12
285/302
1,334,007 A * 3/1920 White ............... F16L 27/12
277/621
(Continued)

FOREIGN PATENT DOCUMENTS

FR         2 672 104     *   7/1992

OTHER PUBLICATIONS

EPO translation of Murias FR 2 672 104 published Jul. 31, 1992 (Year: 1992).*

*Primary Examiner* — Stephen Hobson
(74) *Attorney, Agent, or Firm* — Merek, Blackmon & Voorhees, LLC

(57) ABSTRACT

An air grid for supplying air under pressure. The air grid may be used as an air scour system for a filter for removing at least some impurities (e.g., foreign matter of any nature including a solid, a liquid or a gas) from water or wastewater or as an aerator for aerating wastewater in an aeration tank or basin. The air grid includes an adapter for permitting in field adjustment of one or more components (e.g., drop pipe) of the air grid. Preferably, the adapter houses a portion of an air supply header and a portion of a drop pipe such that the air supply header is disposed above the drop pipe. The adapter may include a detachable sealing assembly. A tool may be provided for inserting and/or removing one or more components of the air grid from the operation environment.

22 Claims, 6 Drawing Sheets

(51) Int. Cl.
  *C02F 3/16*    (2006.01)
  *B01D 24/26*   (2006.01)
  *B01D 24/00*   (2006.01)
  *B01D 24/20*   (2006.01)
  *F16L 27/12*   (2006.01)
  *F16L 19/08*   (2006.01)

(52) U.S. Cl.
  CPC ......... *C02F 2303/16* (2013.01); *F16L 19/086* (2013.01); *F16L 27/12* (2013.01); *F16L 27/125* (2013.01); *Y02W 10/15* (2015.05)

(56) References Cited

U.S. PATENT DOCUMENTS

| | | | | |
|---|---|---|---|---|
| 2,297,966 A | * | 10/1942 | Luff | E03C 1/122 |
| | | | | 285/133.4 |
| 3,402,126 A | * | 9/1968 | Cioffi | B01J 47/04 |
| | | | | 210/279 |
| 3,847,392 A | * | 11/1974 | Horwinski | A62C 37/09 |
| | | | | 239/209 |
| 4,071,266 A | * | 1/1978 | Mountford | F16L 27/12 |
| | | | | 239/209 |
| 5,166,220 A | * | 11/1992 | McMahon | B01J 47/06 |
| | | | | 210/670 |
| 5,534,202 A | * | 7/1996 | Roberts | B01D 24/24 |
| | | | | 261/122.1 |
| 5,673,481 A | | 10/1997 | Roberts et al. | |
| 6,685,162 B2 | * | 2/2004 | Carpenter | F16L 27/12 |
| | | | | 239/133 |
| 8,454,841 B2 | * | 6/2013 | Roberts | B01D 24/24 |
| | | | | 210/785 |
| 8,652,328 B2 | | 2/2014 | Roberts | |
| 8,889,015 B2 | * | 11/2014 | Roberts | B01D 24/24 |
| | | | | 210/795 |
| 9,816,656 B2 | * | 11/2017 | Crompton | F16L 21/007 |
| 2003/0116962 A1 | * | 6/2003 | Magennis | F16L 41/02 |
| | | | | 285/133.21 |
| 2007/0000558 A1 | * | 1/2007 | Burris | B01D 21/04 |
| | | | | 141/65 |
| 2008/0001402 A1 | * | 1/2008 | Yen | E03C 1/021 |
| | | | | 285/302 |
| 2009/0261575 A1 | * | 10/2009 | Bull | E21B 17/02 |
| | | | | 285/32 |
| 2014/0131262 A1 | | 5/2014 | Roberts | |
| 2015/0068988 A1 | | 3/2015 | Roberts | |
| 2015/0068989 A1 | | 3/2015 | Roberts et al. | |

* cited by examiner

APPARATUS AND METHOD FOR REMOVING IMPURITIES FROM WATER OR WASTEWATER

FIELD OF THE INVENTION

Preferred forms of the present invention are directed to an apparatus and method for removing impurities from water and/or wastewater. More specifically, preferred forms of the present invention are directed to an air grid of an air scour system used to air scour a filtering element (e.g., filter bed) of a filtration unit or compartment during a washing cycle. The air scour system includes one or more components that permits field adjustment of the position of one or more components of the air grid of the air scour system. The present invention is not limited to air grids used in a filter. Rather, one or more air grids utilizing the present invention can be used in aerator tanks for wastewater to aerate the wastewater stored in the aerator tanks.

BACKGROUND OF THE INVENTION

Various filters have been employed to remove at least some impurities from water or wastewater. Prior filters include but are not limited to upflow filters or upflow clarifiers, downflow filters or downflow clarifiers, bi-flow filters and aerators. Preferred forms of the present invention are directed to a filter of any suitable type and/or an air scour system operably associated therewith to enhance one or more of numerous aspects of the filtration process including: (i) installation of the filter and/or various components thereof; (ii) servicing of the filter and/or components thereof; and/or, (iii) operation of the filter during a filtration cycle and a cleaning cycle.

Preferred forms of the present invention are further directed to air grids for aerating wastewater in an aerator tank for wastewater.

Preferred forms of the present invention further include a tool for inserting a drop pipe and one or more components attached to the drop pipe in a filter compartment. The tool can also be configured to remove the drop pipe and one or more components attached to the drop pipe from the filter compartment.

By way of example only and not limitation, filters having granular beds have employed air scour devices to improve cleaning of the granular filter bed. U.S. Pat. Nos. 5,534,202 and 5,673,481 disclose, inter alia, a known air scour system and a method of installing the same.

OBJECTS AND SUMMARY OF THE INVENTION

An object of a preferred form of the present invention is to provide a novel and unobvious apparatus and method for removing impurities from water and/or wastewater.

Another object of a preferred form of the present invention is to provide a novel and unobvious air scour system for an apparatus for removing impurities from water and/or wastewater.

A further object of a preferred embodiment of the present invention is to provide an air scour system to enhance one or more of numerous aspects of the filtration process including: (i) installation, adjustment and or removal of various components of a filter; (ii) servicing of the filter and/or components thereof; and/or, (iii) operation of the filter during a filtration cycle and a cleaning cycle.

Still another object of a preferred embodiment of the present invention is to provide an air scour system having an adapter that permits vertical adjustment of an air supply drop pipe in the field, i.e., at the filter site.

A further object of a preferred embodiment of the present invention is to provide an adapter permitting adjustment of one or more components of the air scour system (e.g., air supply drop pipe) having a detachable sealing assembly.

Yet another object of a preferred embodiment of the present invention is to provide a tool for inserting a drop pipe and one or more components attached to the drop pipe in a filter compartment.

Yet a further object of a preferred embodiment of the present invention is to provide a filter with an adapter to permit height adjustment of a filter component including but not limited to a fluid conduit.

Still a further object of a preferred embodiment of the present invention is to provide a tool for removing the drop pipe and one or more components attached to the drop pipe from the filter compartment.

Yet still another object of a preferred embodiment of the present invention is to provide an air grid for aerating an aerator tank for wastewater where the air grid includes one or more components that permit adjustment of one or more components of the air grid.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to apparatus including an air grid. The air grid includes a substantially vertically extending drop pipe, an air distribution header and an air supply header. The apparatus further includes an adapter for permitting vertical adjustment of the substantially vertically extending drop pipe. The adapter includes a hollow member surrounding a portion of the substantially vertically extending drop pipe. The portion of the substantially vertically extending drop pipe has a first orifice for receiving pressurized air supplied by the air supply header. The hollow member includes a first hollow section and a second hollow section. The first hollow section is connected to and positioned above the second hollow section. The first hollow section has an internal diameter having a size greater than an external diameter of the air supply header to allow a portion of the air supply header to be disposed in the first hollow section.

Another preferred embodiment of the present invention is directed to an apparatus including an air grid for air scouring a filter bed. The air grid includes a substantially vertically extending drop pipe, an air distribution header and an air supply header. The apparatus includes an adapter for permitting vertical adjustment of the substantially vertically extending drop pipe. The adapter has a hollow member surrounding a portion of the substantially vertically extending drop pipe. The portion of the substantially vertically extending drop pipe has a first orifice for receiving pressurized air supplied by the air supply header. The hollow member includes an opening sized to allow the portion of the substantially vertically extending drop pipe to be inserted into the hollow member. The adapter further includes a sealing assembly detachably connected to the hollow member.

A further embodiment of the present invention is directed to an apparatus including an air grid for air scouring a filter bed. The air grid includes a substantially vertically extending drop pipe, an air distribution header and an air supply header. The apparatus further includes an adapter for permitting vertical adjustment of the substantially vertically extending drop pipe. The adapter has a hollow member surrounding a portion of the substantially vertically extending drop pipe. The portion of the substantially vertically extending drop pipe has a first orifice for receiving pressurized air supplied by the air supply header. The hollow member has an opening sized to allow the portion of the substantially vertically extending drop pipe to be inserted into the hollow member. The adapter further includes a sealing assembly detachably connected to the hollow member. The sealing assembly includes a support member and a first seal. The first seal is housed in the support member.

Still another embodiment of the present invention is directed to an apparatus including an air grid for air scouring a filter bed. The air grid includes a substantially vertically extending drop pipe, an air distribution header and an air supply header. The apparatus further includes an adapter for permitting vertical adjustment of the substantially vertically extending drop pipe. The adapter has a hollow member surrounding a portion of the substantially vertically extending drop pipe. The portion of the substantially vertically extending drop pipe has a first orifice for receiving pressurized air supplied by the air supply header. The hollow member includes an opening sized to allow the portion of the substantially vertically extending drop pipe to be inserted into the hollow member. The apparatus further includes a positioning member for inserting the substantially vertically extending drop pipe into the hollow member and removing the substantially vertically extending drop pipe from the hollow member. The positioning member includes a biasing member and at least one connecting member. The biasing member biases at least one connecting member into engagement with a connection portion of the substantially vertically extending drop pipe to connect the positioning member and the substantially vertically extending drop pipe.

DETAILED DESCRIPTION OF THE PREFERRED EMBODIMENTS OF THE INVENTION

The preferred forms of the invention will now be described with reference to FIGS. 1-10. The appended claims are not limited to the preferred forms and no term and/or phrase used herein is to be given a meaning other than its ordinary meaning unless it is expressly stated otherwise.

FIGS. 1 Through 9

Figure 1:
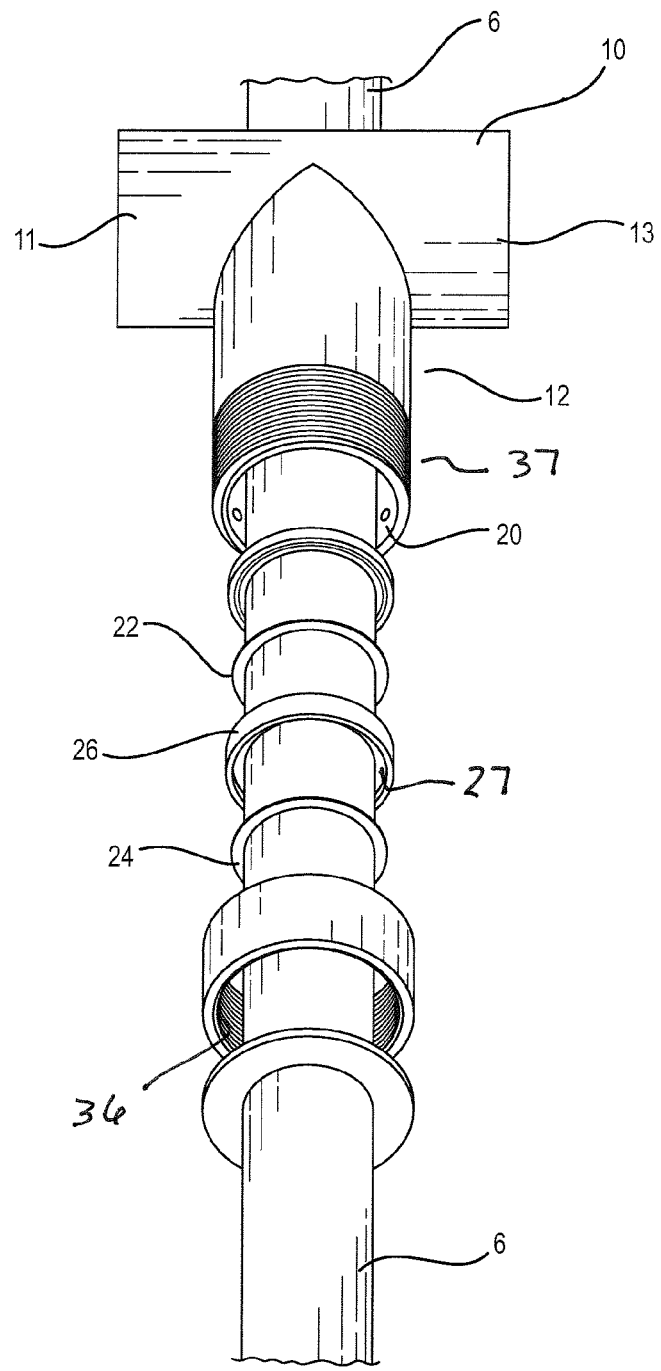
FIG. 1 is an exploded perspective view of an adapter formed in accordance with a preferred embodiment of the present invention with a drop pipe partially inserted into the adapter.
Figure 2:
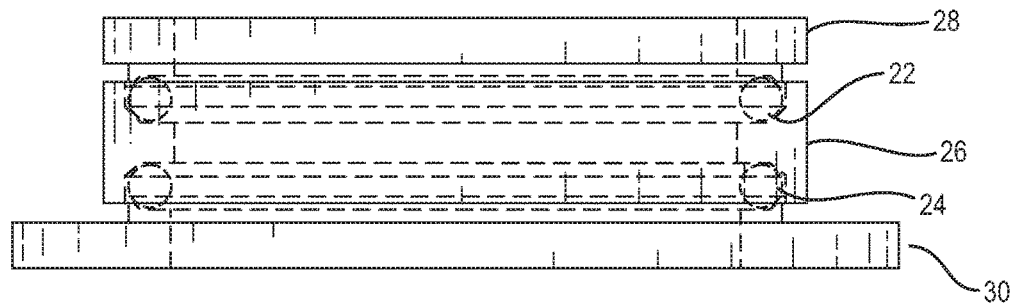
FIG. 2 is an elevational view of a portion of a preferred sealing assembly for the adapter.
Figures 5, 6:
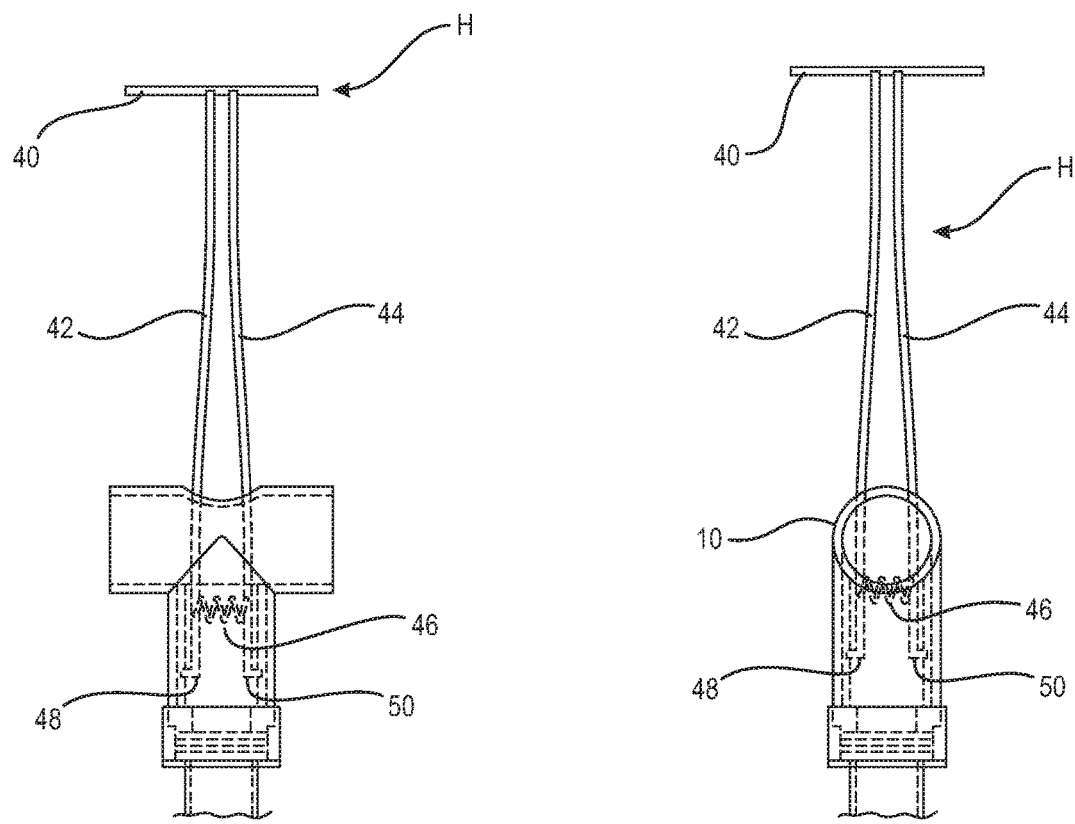
FIG. 5 is an elevational view of an insertion and removal tool connected to a drop pipe (only a portion of which is shown) positioned in a portion of the adapter.
FIG. 6 is a view of the components depicted in FIG. 5 rotated ninety degrees.
Figure 3:
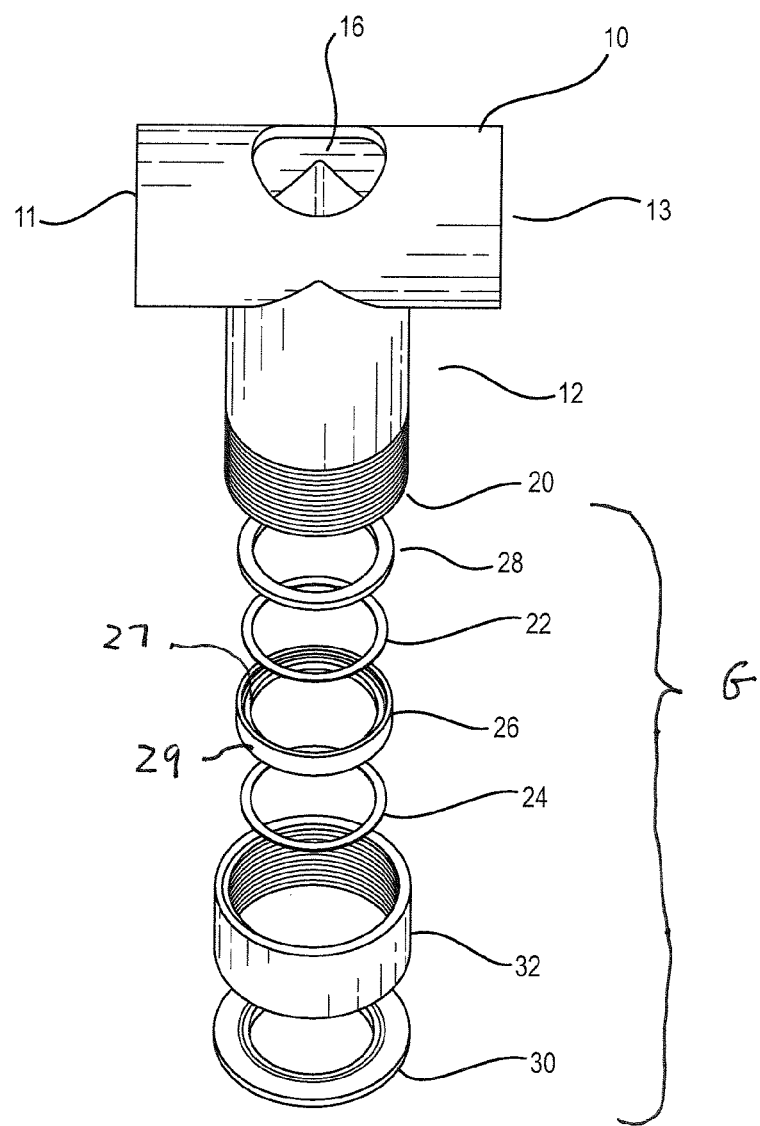
FIG. 3 is an exploded perspective view of the adapter depicted in FIG. 1.
Figure 4:
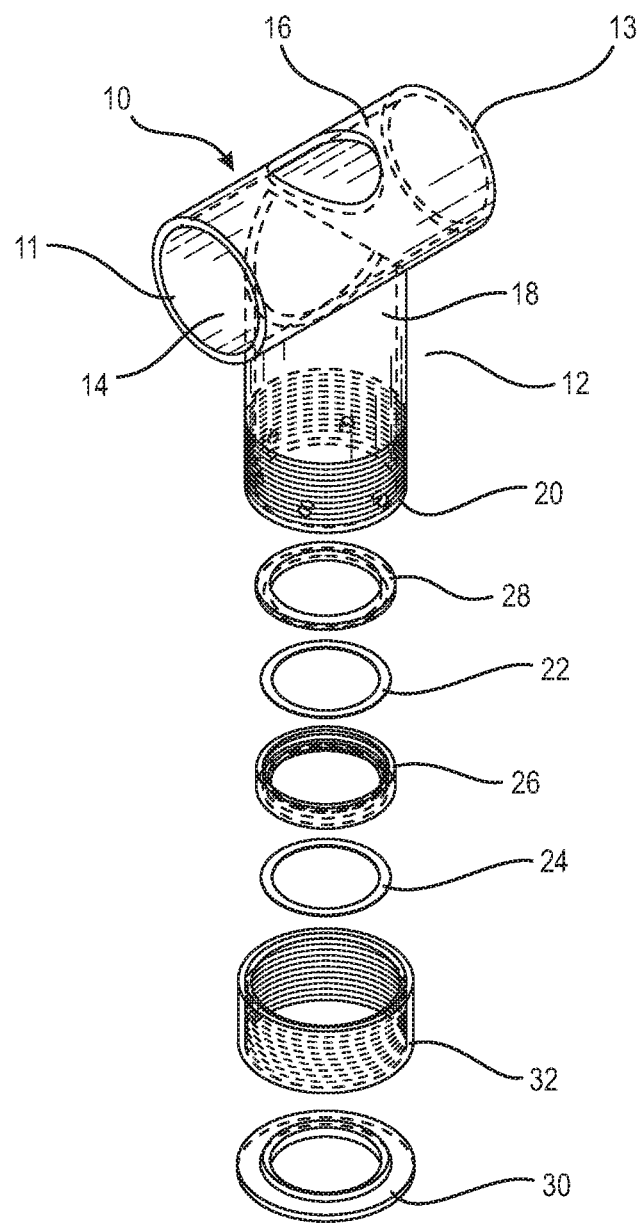
FIG. 4 is an exploded perspective view of the adapter depicted in FIG. 1 with a portion of the T-shaped member of the adapter being removed.
Figure 7:
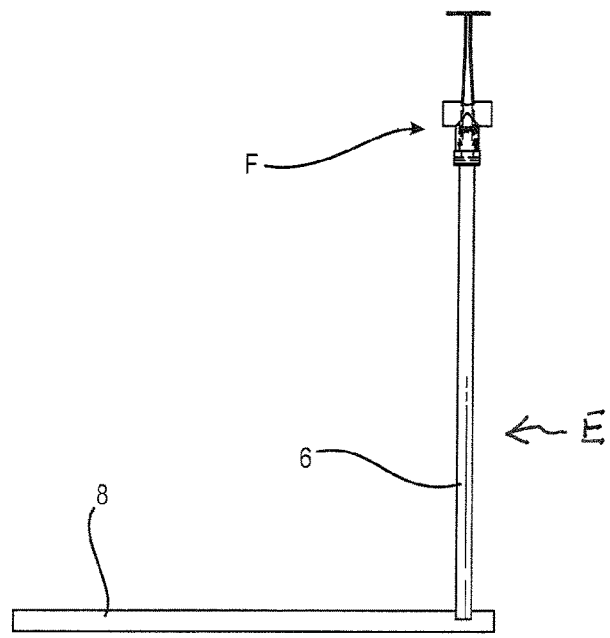
FIG. 7 is an elevational view of the insertion and removal tool connected to a drop pipe positioned in a portion of the adapter and the drop pipe is connected to an air distribution header.
Figure 8:
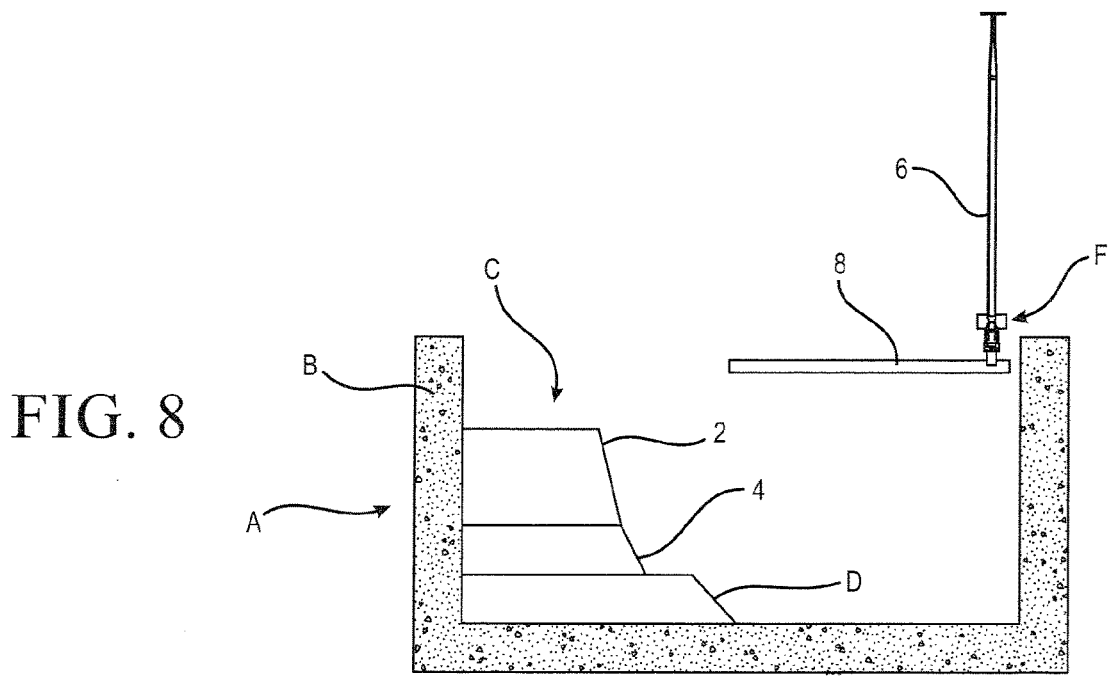
FIG. 8 is an elevational view of the insertion and removal tool connected to a drop pipe positioned in a portion of the adapter and the drop pipe is connected to an air distribution header with the drop pipe, adapter and air distribution header positioned above a filter bed.
Figure 9:
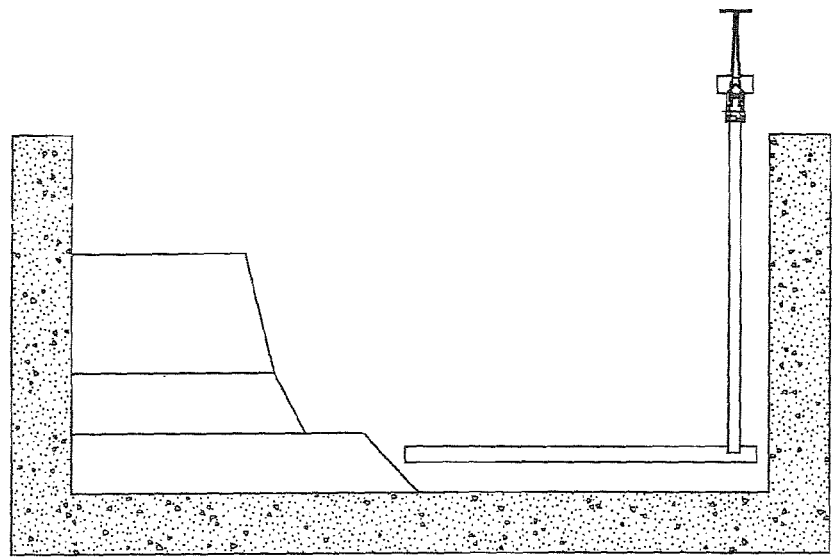
FIG. 9 is an elevational view similar to FIG. 8 but showing the air distribution header and drop pipe positioned inside of a filter tank or compartment.

Referring to FIGS. 1 to 9, a filter system A employing a preferred form of the invention is illustrated in one of many possible configurations. Referring to FIGS. 8 and 9, filter system A includes a tank B, a filter bed C, an underdrain D, an air grid system E and an air supply source (not shown) connected to the air grid system. Filter system A can include one or more downflow filters, downflow clarifiers, upflow filters, upflow clarifiers, bi-flow filters or any combination thereof. As used herein, the term filter refers to any device that removes at least some impurities (e.g. foreign matter of any nature including a solid, a liquid or a gas) from water or wastewater. Tank B can be formed from concrete, metal or other suitable material. Further, tank B can be rectangular, circular or any other suitable shape. The air grid system E is configured to air scour the filter bed C by uniformly distributing pressurized air throughout the filter bed C during a backwash cycle. The air scour washing process could be performed simultaneously with a liquid wash cycle or before or after a liquid wash cycle. Air scour greatly assists in removing impurities trapped in the filter bed during a filtration cycle.

Filter bed C, as shown in FIGS. 8 and 9, may include one or more layers of filter media 2 supported by a layer of gravel 4. It will be readily appreciated that any suitable filter bed may be used including a single layer filter bed or a multi-layer filter bed. Further, while a gravel layer 4 is depicted as supporting media layer 2 above an underdrain D, the underdrain D may be any conventional type including an underdrain formed from a plurality of laterals having a porous plate connected thereto obviating the need for a gravel layer. Further, underdrain D may be formed with slots or openings on the top surface of the underdrain which are sized to eliminate the need for a gravel layer 4 as well as a separate media retaining plate (e.g., porous plate).

Figure 10:
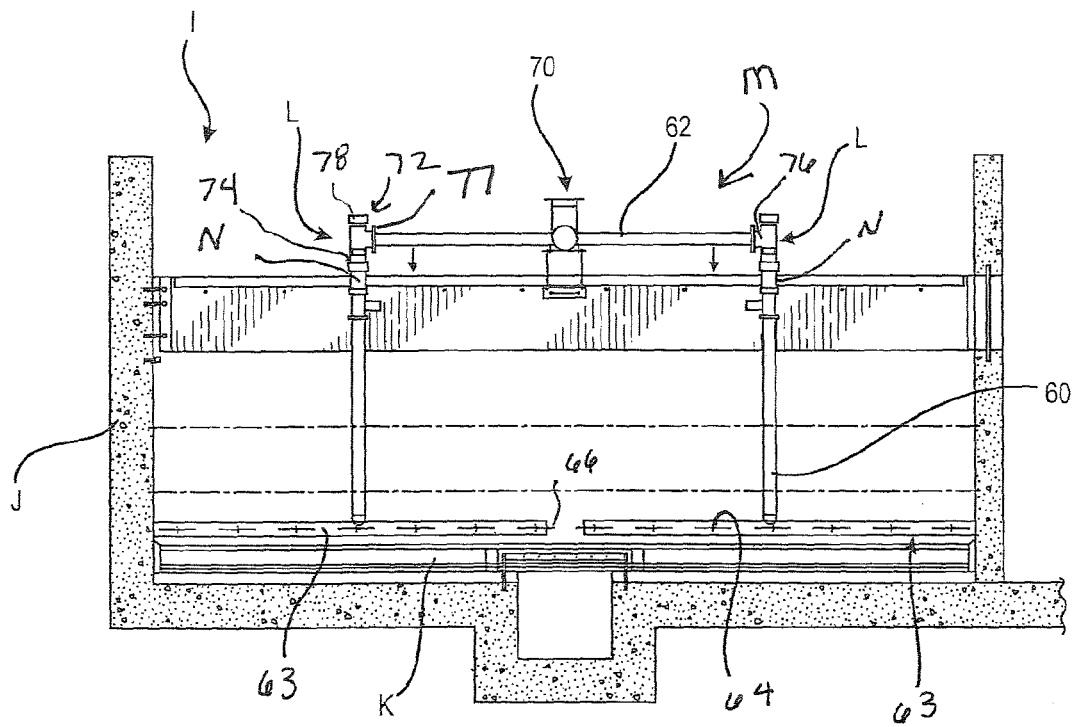
FIG. 10 is a fragmentary elevational view of an alternative embodiment of the present invention.

The air gird system E includes one or more substantially vertically extending drop pipes 6, an adapter F, a substantially horizontally extending air distribution header 8 and an air supply header (an example of which is shown in FIG. 10) connected to a pressurized air supply source. Preferably, drop pipe 6 includes one or more openings formed in or about the upper end of the drop pipe 6 to receive pressurized air from the air supply header. For example, the uppermost end of drop pipe 6 could have a large opening communicating with and having a diameter equal to the diameter of the hollow cavity extending through the length of drop pipe 6. A plurality of substantially horizontally extending laterals and sub-laterals (examples of which are shown in FIG. 10) may be connected to air distribution header 8. The air grid system can include multiple grids in filter compartment B similar to the multiple grid systems disclosed in U.S. Pat. Nos. 5,534,202 and 5,673,481, the entire contents of which are incorporated herein by reference.

While FIGS. 8 and 9 depict drop pipe 6 connected adjacent an end of air distribution header 8, drop pipe 6 could be connected to any portion of air distribution header 8 including but not limited to a center section. Air distribution header 8 includes a hollow cavity extending along substantially the entire length of header 8. The hollow cavity of header 8 is in fluid communication with the hollow cavity of drop pipe 6. It should be noted that the left and right ends of header 8 may be sealed. If laterals and sub-laterals are used, the laterals and sub-laterals each have hollow cavities in fluid communication with the hollow cavity of header 8 and the hollow cavity of drop pipe 6. The sub-laterals and/or laterals may include a plurality of openings that allow pressurized air to escape into the filter bed C. If laterals and sub-laterals are not used, a plurality of openings can be uniformly formed in header 8 to allow pressurized air to escape into filter bed 6 in a uniform manner.

Header 8 and the corresponding laterals and sub-laterals (if used) can be positioned in any suitable location including in a lower portion of the lowermost layer of filter media.

The air grid system E includes an adapter F. Adapter F is configured to permit vertical adjustment of drop pipe 6 during installation or adjustment of the air grid system E, i.e., adapter F permits on site adjustment of one or more components of the air grid system E. Adapter F is particularly advantageous as it allows one to readily compensate for a drop pipe or other component that is inadvertently sized incorrectly (e.g., too short or too long) without any or at the very least minimal field alteration to drop pipe 6.

Referring to FIGS. 1 to 9, adapter F includes hollow tubular members 10 and 12 each having a hollow cavity extending the length of the corresponding member. Members 10 and 12 can be formed as one piece or multiple pieces welded together or otherwise connected to form a substantially T-shaped member. Member 10 has open ends 11 and 13. Hollow cavity 14 of member 10 preferably has an internal diameter of a sufficient size to house a portion of an air supply header. The housed portion of the air supply header will include one or more openings communicating with one or more openings in drop pipe 6 so that the air supply header can supply pressurized air to drop pipe 6. For example, an opening can be formed in the housed portion of the air supply header that is vertically aligned with an opening formed in the uppermost surface of drop pipe 6 so that pressurized air from the air supply header will flow into drop pipe 6.

In one form, the air supply header can extend outwardly from both ends 11 and 13 of member 10. However, it should be noted that members 10 and 12 can be configured to form a substantially L-shaped member or elbow with two open ends. In this instance, the air supply header would preferably extend outwardly from only the open end of the substantially horizontally extending portion of the L-shaped member. Another opening may be formed in an upper surface of the substantially horizontally extending portion of the L-shaped member that is aligned with the substantially vertically extending portion of the L-shaped member where the opening has a diameter greater than the external diameter of the drop pipe to allow the drop pipe to pass through the opening.

When installed in an operating position, member 10 is preferably oriented to extend substantially horizontally. Member 10 includes an opening 16 preferably formed in an uppermost surface of member 10. Opening 16 has a diameter greater than the external diameter of drop pipe 6 so that the drop pipe 6 may pass through opening 16. Member 12 includes a hollow cavity 18 communicating with hollow cavity 14 and open lower end 20. This configuration allows the drop pipe 6 to be inserted into hollow cavity 18 from above adapter F through opening 16. Alternatively, drop pipe 6 can be inserted into hollow cavity 18 from below adapter F through opening 20 such that a portion of drop pipe 6 extends above member 10 during installation of the air grid E. It should be noted that opening 16, is optional, i.e., opening 16 can be omitted as the drop pipe can be inserted into hollow cavity 18 through opening 20.

In an operating position, a portion of the drop pipe 6 is preferably housed in member 12 of adapter F. Preferably, the upper end of drop pipe 6 when installed in an operating position is disposed below or adjacent one or more openings formed in a lowermost surface of the portion of the air supply header housed in member 10 so that the air supply header can supply pressurized air to drop pipe 6. Opening 16 when present during operation of the air grid system E can be sealed by any suitable sealing element including but not limited to an elastomeric member disposed in opening 16 to close off opening 16. The vertical height of the drop pipe may be readily varied. Specifically, the uppermost end of drop pipe 6 can touch or be located directly adjacent to a lowermost surface of the portion of the air supply header housed in member 10. Alternatively, the uppermost end of the drop pipe 6 can disposed slightly above a lower end of adapter F. It should be noted that by altering the length of member 12 the amount of vertical adjustment permitted by adapter F can be readily varied.

Adapter F further includes a sealing assembly G. Sealing assembly G preferably includes seals 22 and 24, dual seal support 26 for supporting both seals 22 and 24, upper retaining member 28, lower retaining member 30 and hollow member 32. Referring to FIGS. 1 to 4, the upper and lower sides of seal support 26 include a recessed seal supporting surface 27 supporting the corresponding seal as seen in, for example, FIG. 2. Seal support 26 further includes a vertically extending wall 29 that engage seals 22 and 24 and restrict outward expansion of seals 22 and 24.

Upper retaining member 28 can be welded inside hollow cavity 18 of member 12 or otherwise connected to the internal wall forming hollow cavity 18. Alternatively, members 12 and 28 can be formed as one piece. Lower retaining member 30 can be welded or otherwise connected to the lower end of hollow member 32. Alternatively, members 30 and 32 can be formed as one piece.

Hollow member 32 preferably has internal threads 36 that mate with external threads 37 of member 12 so that the sealing assembly G can be detachably connected to the lower end of member 12. While a threaded connection is preferred, it will be readily appreciated that the sealing assembly G can be connected in any manner to member 12.

As member 32 is threaded onto support member 20, the distance between retaining members 30 and 28 decreases thereby causing seals 22 and 24 to compress. The configuration of the dual seal support 26 causes the seals to move inwardly as they are being compressed to engage and seal around the corresponding portion of drop pipe 6. Preferably, the sealing assembly G is not tightened to assume an operating position until the drop pipe has been positioned in an operating position. Once the drop pipe is installed in an operating position, the air supply header is inserted into hollow member 10. Subsequently, opening 16 and the ends 11 and 13 may be sealed using any suitable sealing device or member. A sealing assembly similar to sealing assembly G could be used to seal ends 11 and 13 of member 10.

The components of adapter F can be formed of any suitable material. For example, elements 10, 12, 26, 28, 30 and 32 can be formed from metal (e.g., stainless steel) or other suitable material including but not limited to PVC. Seals 22 and 24 can be formed from a suitable material including but not limited an elastomeric material.

It should be noted that air grid system E is not limited to use in a filter. Rather, air grid system E can be used in an aerator tank for wastewater for aerating the wastewater in the aerator tank.

Referring to FIGS. 5 to 9, a preferred insertion and removal tool H will now be described. Tool H preferably includes a handle 40, legs 42 and 44, spring 46 and attachment members 48 and 50. Spring 46 biases legs 42 and 44 apart to cause attachment members 48 and 50 to move outwardly to engage a complementarily shaped portion of the internal surface of drop pipe 6. For example, attachment members 48 and 50 could be round, square, triangular or otherwise shaped pegs or feet that when biased outwardly engage a suitably shaped recess or groove formed in the internal surface of drop pipe 6 to connect tool H to drop pipe 6. The positive and detachable connection created between the tool H and drop pipe 6 allows an individual to install, adjust and/or remove the drop pipe 6 and one or more components of the air grid E (e.g., air distribution header and corresponding laterals and sub-laterals). To attach tool H to drop pipe 6, an individual merely squeezes legs 42 and 44 together sufficiently so that the attachment members 48 and 50 can be inserted into the hollow cavity of drop pipe 6 to engage the complementary portion of drop pipe 6 (e.g., recesses or groove) to install, adjust or remove drop pipe 6 from filter tank B. Once the attachment members 48 and 50 are aligned with the complimentary portions of the internal diameter of drop pipe 6, the individual releases the legs and allows the attachments members to engage the complimentary portions of the internal diameter of drop pipe 6.

To detach tool H from drop pipe 6, an individual merely squeezes legs 42 and 44 together so that attachment members 48 and 50 disengage from the complementary portions of drop pipe 6 and pulls on handle 40 until the portion of tool H extending into drop pipe 6 is be removed from drop pipe 6. Legs 42 and 44 are the compressing means for compressing spring 46 to disengage the connecting or attachment members 48 and 50 from the complementary portions of the drop pipe 6.

FIG. 10

Referring to FIG. 10, a filter system I employing an alternative form of the invention is illustrated in one of many possible configurations. Filter system I includes a tank J, a filter bed (not shown) having one or more layers of filter media, an underdrain K, an air grid system M and an air supply source (not shown) connected to the air grid system for supplying air under pressure to the air grid system M. Preferably, underdrain K is formed such that no layer of gravel or separate media retaining plate is required to support the filter media above the underdrain K. For example, a plurality of thin slots may be cut into the top surface of underdrain K using any suitable process including but not limited to a water jet cutting process. By sizing the width of the slots to be thin or narrow, the top surface of underdrain K will retain small filter media particles without the filter media particles passing into the underdrain or clogging the slots.

Filter system I can include one or more downflow filters, downflow clarifiers, upflow filters, upflow clarifiers, bi-flow filters or any combination thereof. Tank J can be formed from concrete, metal or other suitable material. Further, tank J can be rectangular, circular or any other suitable shape.

The air grid system M is configured to air scour the filter bed by uniformly distributing pressurized air throughout the filter bed during a backwash cycle. The air scour could be performed simultaneously with a liquid wash cycle or before or after a liquid wash cycle. Air scour greatly assists in removing impurities trapped in the filter bed during a filtration cycle.

The air grid system M includes a pair of drop pipes 60 each connected to air supply header 62. While two drop pipes are shown, the number of drop pipes in any given filter may be varied as desired. A coupling conduit 70 is provided for coupling the air supply header 62 to a source of pressurized air. Each drop pipe 60 is connected to an air distribution header 63. A plurality of laterals 64 may extend outwardly from each side of air distribution header 63 and be configured to direct pressurized air from the air distribution header 63 to a plurality of sub-laterals 66 extending outwardly from each lateral 64. Each sub-lateral 66 may include a plurality of openings uniformly spaced along the length of the sub-lateral to uniformly release pressurized air into the filter bed during a wash cycle. The position of the air distribution header 63 and corresponding laterals and sub-laterals in the filter may be readily varied as desired. Preferably, the laterals are conduits that extend substantially perpendicular to header 63 and the sub-laterals are conduits that extend substantially parallel to header 63.

The air grid system M includes an adapter L for each drop pipe 60. Adapter L is configured to permit vertical adjustment of the corresponding drop pipe during installation or adjustment of the air grid system, i.e., adapter L permits on site adjustment of one or more components of the air grid system M. Adapter L is particularly advantageous as it allows one to readily compensate for a drop pipe or other component that is inadvertently sized incorrectly (e.g., too short or too long) without any or at the very least minimal field alteration to the size of the corresponding drop pipe.

Adapter L preferably includes a substantially T-shaped hollow member 72 and a detachable sealing assembly N. Preferably, sealing assembly N is the same as sealing assembly G. Sealing assembly N is preferably threaded onto mating threads formed on lower end 74 of member 72. The length of lower end 74 can be readily varied to vary the amount of vertical adjustment of the corresponding drop pipe permitted by adapter L. Intermediate section 76 receives a corresponding end of air supply header 62. A seal 77 may be provided to seal the connection between section 76 and air supply header 62. Seal 77 may be identical to seals G and N. When installed in an operating position, an open upper end of the drop pipe 60 is disposed in hollow member 72 such that the drop pipe does not block the flow of pressurized air from the air supply header 62 into the upper end of the drop pipe. Hence, the open upper end of the drop pipe 60 has an uppermost position in hollow member 72 which is just below the point where air would be prevented from flowing into header 62 and a lowermost position which is slightly above the lowermost end of hollow member 72.

Upper end 78 of hollow member 72 includes an opening of sufficient size to allow a corresponding drop pipe to pass through the opening in end 78. After the drop pipe assumes an operating position, the open upper end 78 may be sealed by any suitable sealing member. In this embodiment, it should be noted that adapters L can be connected to air supply header 62 prior to or after drop pipes 60 are oriented in an operating position.

It should be noted that air grid system M is not limited to use in a filter. Rather, air grid system M can be used in an aerator tank for wastewater for aerating the wastewater in the aerator tank.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. An apparatus comprising:
    (a) an air grid having a substantially vertically extending drop pipe, an air distribution header and an air supply header, said air grid being configured to direct air into one of a filter bed of a filter and an aerator tank having wastewater;
    (b) an adapter for permitting vertical adjustment of said substantially vertically extending drop pipe, said adapter includes a hollow member surrounding a first portion of said substantially vertically extending drop pipe, said first portion of said substantially vertically extending drop pipe having a first orifice for receiving pressurized air supplied by said air supply header, said hollow member including a first hollow section and a second hollow section, said first hollow section being connected to said second hollow section, said first hollow section having an internal cavity of sufficient size to allow a portion of said air supply header to extend into said internal cavity of said first hollow section;
    (c) said second hollow section being configured to allow, during installation of said substantially vertically extending drop pipe, a second portion of said substantially vertically extending drop pipe to initially be positioned above an uppermost portion of said second hollow section and subsequently allow said second portion of said substantially vertically extending drop pipe to slide through said second hollow section so that said second portion of said substantially vertically extending drop pipe when in an operating position is disposed below a lowermost portion of said second hollow section, said second portion being disposed below said first portion.

2. An apparatus as set forth in claim 1, wherein:
    (a) said first hollow section extends substantially perpendicular to said substantially vertically extending drop pipe and said second hollow section extends substantially parallel to said substantially vertically extending drop pipe; and,
    (b) said first hollow section including an upper surface and an opening formed in said upper surface, said opening being sized to allow said substantially vertically extending drop pipe to pass through said opening.

3. An apparatus as set forth in claim 1, wherein:
    (a) said adapter includes a sealing assembly, said sealing assembly being connected to a lower end of said second hollow section and including a first seal.

4. An apparatus as set forth in claim 3, wherein:
    (a) said sealing assembly includes a second seal, said first seal and said second seal are disposed below a lowermost portion of said first hollow section.

5. An apparatus as set forth in claim 1, wherein:
    (a) said substantially vertically extending drop pipe includes an upper end and a lower end, said upper end is disposed below a lowermost surface of said first hollow section.

6. An apparatus as set forth in claim 1, wherein:
    (a) said first hollow section extends substantially perpendicular to said substantially vertically extending drop pipe and includes an opening extending through said first hollow section to allow said substantially vertically extending drop pipe to slide through said first hollow section.

7. An apparatus comprising:
    (a) an air grid having a substantially vertically extending drop pipe, an air distribution header and an air supply header;
    (b) an adapter for permitting vertical adjustment of said substantially vertically extending drop pipe, said adapter includes a hollow member surrounding a portion of said substantially vertically extending drop pipe, said portion of said substantially vertically extending drop pipe having a first orifice for receiving pressurized air supplied by said air supply header, said hollow member including a first hollow section and a second hollow section, said first hollow section being connected to said second hollow section, said first hollow section having an internal cavity having a sufficient size to allow a portion of said air supply header to extend into said internal cavity of said first hollow section;
    (c) said substantially vertically extending drop pipe having an upper end and a lower end, said upper end being disposed below an upper surface of said first hollow section.

8. An apparatus comprising:
    (a) an air grid for air scouring a filter bed, said air grid includes a substantially vertically extending drop pipe, an air distribution header and an air supply header; and,
    (b) an adapter for permitting vertical adjustment of said substantially vertically extending drop pipe, said adapter having a first hollow member surrounding a portion of said substantially vertically extending drop pipe, said first hollow member being configured to allow said substantially vertically extending drop pipe to slide in said first hollow member, said portion of said substantially vertically extending drop pipe having a first orifice for receiving pressurized air supplied by said air supply header, said adapter further including a second hollow member being configured to allow said air supply header to slide in said second hollow member, said first hollow member including an opening being sized to allow said portion of said substantially vertically extending drop pipe to be inserted into said first hollow member; and,
    (c) said adapter further including a sealing assembly detachably connected to said first hollow member.

9. An apparatus as set forth in claim 8, wherein:
    (a) said sealing assembly is detachably connected to a lower end of said first hollow member, said sealing assembly includes a first seal and a second seal, and said first seal and said second seal are positioned adjacent said lower end of said first hollow member.

10. An apparatus as set forth in claim 9, wherein:
(a) said lower end of said first hollow member includes external threads for detachably connecting said sealing assembly to said first hollow member.

11. An apparatus as set forth in claim 9, wherein:
(a) said portion of said substantially vertically extending drop pipe is positioned in said first hollow member and a portion of said air supply header is positioned in said second hollow member, said first seal and said second seal are positioned below a lowermost surface of said portion of said air supply header positioned in said second hollow member.

12. An apparatus as set forth in claim 11, wherein:
(a) said first seal and said second seal surround and engage said substantially vertically extending drop pipe.

13. An apparatus as set forth in claim 8, wherein:
(a) said first hollow member and said second hollow member form a substantially T-shaped adapter.

14. An apparatus comprising:
(a) an air grid for air scouring a filter bed, said air grid includes a substantially vertically extending drop pipe, an air distribution header and an air supply header; and,
(b) an adapter having a horizontally extending hollow member and a vertically extending hollow member, said vertically extending hollow member being configured to allow said substantially vertically extending drop pipe to slide in said vertically extending hollow member to permit adjustment of said substantially vertically extending drop pipe, said horizontally extending hollow member being configured to allow said air supply header to be inserted into said horizontally extending hollow member such that an uppermost portion of said substantially vertically extending drop pipe does not extend above an uppermost portion of said air supply header.

15. An apparatus as set forth in claim 14, wherein:
(a) said horizontally extending hollow member is connected to an uppermost end of said vertically extending hollow member.

16. An apparatus as set forth in claim 14, wherein:
(a) said horizontally extending hollow member includes an opening for allowing said substantially vertically extending drop pipe to slide through said opening of said horizontally extending hollow member.

17. An apparatus as set forth in claim 16, wherein:
(a) said horizontally extending hollow member and said vertically extending hollow member are formed from a single piece of material.

18. An apparatus as set forth in claim 16, further including:
(a) a sealing assembly threaded onto a lowermost portion of said vertically extending hollow member, said sealing assembly forming a lowermost portion of said adapter.

19. An apparatus comprising:
(a) an air grid for air scouring a filter bed, said air grid includes a substantially vertically extending drop pipe, an air distribution header and an air supply header; and,
(b) an adapter for permitting vertical adjustment of said substantially vertically extending drop pipe, said adapter having a hollow member surrounding a portion of said substantially vertically extending drop pipe, said portion of said substantially vertically extending drop pipe having a first orifice for receiving pressurized air supplied by said air supply header, said hollow member including an opening being sized to allow said portion of said substantially vertically extending drop pipe to be inserted into said hollow member; and,
(c) a positioning member for inserting said substantially vertically extending drop pipe into said hollow member and removing said substantially vertically extending drop pipe from said hollow member, said positioning member including a biasing member and at least one connecting member, said biasing member biasing said at least one connecting member into engagement with a connection portion of said substantially vertically extending drop pipe to connect said positioning member and said substantially vertically extending drop pipe.

20. An apparatus as set forth in claim 19, wherein:
(a) said positioning member further includes means for compressing said biasing member to disengage said at least one connecting member from said connection portion of said substantially vertically extending drop pipe to disconnect said positioning member from said substantially vertically extending drop pipe.

21. An apparatus as set forth in claim 20, wherein:
(a) said positioning member includes a handle, said means for compressing includes a pair of legs extending downwardly from said handle, said biasing member is at least one spring connected to each leg of said pair of legs and said at least one connecting member includes a pair of feet, and each foot of said pair of feet extend outwardly from a corresponding leg.

22. An apparatus comprising:
(a) an air grid having first and second substantially vertically extending drop pipes, an air distribution header and an air supply header; and,
(b) first and second adapters for permitting vertical adjustment of said first and second substantially vertically extending drop pipes, respectively, each of said first and second adapters having a hollow member surrounding a portion of a corresponding substantially vertically extending drop pipe, said portion of said corresponding substantially vertically extending drop pipe having a first orifice for receiving pressurized air supplied by said air supply header, said hollow member including a first hollow section and a second hollow section, said first hollow section being connected to said second hollow section, said first hollow section having an internal cavity of sufficient size to allow a corresponding portion of said air supply header to extend into said internal cavity of said first hollow section and said second hollow section being configured to allow a corresponding substantially vertically extending drop pipe to slide in said second hollow section to permit vertical adjustment of the corresponding substantially vertically extending drop pipe.

* * * * *